US011025158B2

United States Patent
Chan

(10) Patent No.: US 11,025,158 B2
(45) Date of Patent: Jun. 1, 2021

(54) POWER SUPPLY APPARATUS CAPABLE TO EXTEND HOLD-UP TIME LENGTH OF OUTPUT VOLTAGE

(71) Applicant: Acer Incorporated, New Taipei (TW)

(72) Inventor: Tzu-Tseng Chan, New Taipei (TW)

(73) Assignee: Acer Incorporated, New Taipei (TW)

(*) Notice: Subject to any disclaimer, the term of this patent is extended or adjusted under 35 U.S.C. 154(b) by 0 days.

(21) Appl. No.: 16/703,821

(22) Filed: Dec. 4, 2019

(65) Prior Publication Data

US 2020/0382004 A1    Dec. 3, 2020

(30) Foreign Application Priority Data

May 29, 2019   (TW) .................................. 108118518

(51) Int. Cl.
*H02M 1/32*   (2007.01)
*H02M 1/00*   (2006.01)

(52) U.S. Cl.
CPC ...... *H02M 1/32* (2013.01); *H02M 2001/0096* (2013.01)

(58) Field of Classification Search
CPC .................. H02M 2001/0096; H02M 1/32
See application file for complete search history.

(56) References Cited

U.S. PATENT DOCUMENTS

| 9,912,239 B2 | 3/2018 | Beedu et al. | |
| 10,033,264 B2* | 7/2018 | Lind | H02M 1/15 |
| 2002/0071300 A1* | 6/2002 | Jang | H02J 7/345 363/125 |
| 2016/0190955 A1* | 6/2016 | Hatakeyama | H02M 1/12 318/3 |
| 2017/0093271 A1* | 3/2017 | Lai | H02M 1/088 |
| 2017/0370972 A1 | 12/2017 | Chen et al. | |

FOREIGN PATENT DOCUMENTS

| CN | 101420175 | 8/2010 |
| CN | 204810144 | 11/2015 |
| TW | M552706 | 12/2017 |
| TW | 201902104 | 1/2019 |

* cited by examiner

*Primary Examiner* — Peter M Novak
(74) *Attorney, Agent, or Firm* — JCIPRNET

(57) ABSTRACT

A power supply apparatus including a rectifier circuit, an energy storage circuit, a power conversion circuit, a detection circuit, an energy supplement circuit, and a control circuit is provided. The rectifier circuit rectifies an AC voltage and provides a DC voltage. The energy storage circuit and the energy supplement circuit store electrical energy according to the DC voltage. The power conversion circuit converts the DC voltage into an output voltage. The detection circuit detects a voltage amplitude of the AC voltage according to the DC voltage and generates a detection signal group accordingly. The control circuit is coupled to the detection circuit to receive the detection signal group. When the control circuit determines that the voltage amplitude of the AC voltage is less than or equal to a first threshold according to the detection signal group, the control circuit instructs the energy supplement circuit to charge the energy storage circuit.

12 Claims, 3 Drawing Sheets

POWER SUPPLY APPARATUS CAPABLE TO EXTEND HOLD-UP TIME LENGTH OF OUTPUT VOLTAGE

CROSS-REFERENCE TO RELATED APPLICATION

This application claims the priority benefit of Taiwan application serial no. 108118518, filed on May 29, 2019. The entirety of the above-mentioned patent application is hereby incorporated by reference herein and made a part of this specification.

BACKGROUND

Technical Field

The disclosure relates to a power supply apparatus, and more particularly to a power supply apparatus capable of extending the hold-up time of an output voltage.

Description of Related Art

The power supply apparatus could convert an alternating current (AC) input voltage provided by the city power system into a direct current (DC) voltage suitable for use by various electronic apparatuses. Therefore, the power supply apparatus including a rectifier, a hold-up circuit, and a converter is widely used in various types of electronic apparatuses.

In general, in the case where the load of the power supply apparatus suddenly changes (for example, from light load to heavy load) or when the utility power is unstable, voltage dips or short interruptions of the AC input voltage will occur. In detail, the voltage dips are thirty percent drop in voltage (i.e., dropped to seventy percent of the original voltage) for 0.25 cycles to 1 cycle. In addition, the short interruptions are hundred percent drop in voltage (i.e., dropped to zero) for 250 cycles. For example, if the frequency of the AC input voltage is 60 Hz, then 1 cycle is about 17 ms and 250 cycles is about 4 seconds.

In order to verify the effects of voltage dips or short interruptions on a test object, the International Electrotechnical Commission defines in the IEC 6100-4-11 standard the immunity of the test object to the two types of voltage changes (i.e., voltage dips and short interruptions) and assesses four levels of the test object as follows.

Level A: The test object is unaffected and remains in normal operation.

Level B: The test object is affected but can automatically resume normal operation.

Level C: The test object is affected and cannot operate normally. The test object needs to be reactivated to resume normal operation.

Level D: The test object is affected and permanently damaged.

Suppose that the test object is a power supply apparatus with Level C and the electronic apparatus to be supplied with power does not have a built-in battery. In this case, during short interruptions of the AC input voltage of the power supply apparatus, the output voltage of the power supply apparatus will drop to zero, such that the electronic apparatus is powered off.

It is necessary to extend the hold-up time of the output voltage after the short interruptions of the AC input voltage of the power supply apparatus. In this way, the impact on the output voltage and electronic equipment caused by voltage short interruptions on the output voltage could be eliminated. Therefore, how to extend the hold-up time of the output voltage is one of the major topics faced by persons skilled in the art.

SUMMARY

In view of the above, the disclosure provides a power supply apparatus capable of extending the hold-up time of the output voltage of the power supply apparatus, thereby eliminating the effects of voltage dips or short interruptions on the output voltage of the power supply apparatus.

The power supply apparatus of the disclosure includes a rectifier circuit, an energy storage circuit, a power conversion circuit, a detection circuit, an energy supplement circuit, and a control circuit. The rectifier circuit is configured to receive an alternating current (AC) voltage and rectify the AC voltage to provide a direct current (DC) voltage to a power bus. The energy storage circuit is coupled to the power bus and is configured to store electrical energy according to the DC voltage and stabilize the DC voltage. The power conversion circuit is coupled to the power bus and is configured to convert the DC voltage into an output voltage. The detection circuit is coupled to the power bus and is configured to detect a voltage amplitude of the AC voltage according to the DC voltage, and generate a detection signal group accordingly. The energy supplement circuit is coupled to the power bus and is configured to store electrical energy according to the DC voltage. The control circuit is coupled to the detection circuit to receive the detection signal group and is coupled to the energy supplement circuit. When the control circuit determines that the voltage amplitude of the AC voltage is less than or equal to a first threshold according to the detection signal group, the control circuit generates a first control signal to the energy supplement circuit. The energy supplement circuit charges the energy storage circuit in response to the first control signal, so as to extend the hold-up time length of the output voltage.

Based on the above, in the power supply apparatus provided by the disclosure, the energy supplement circuit may charge the energy storage circuit during voltage dips or short interruptions of the AC voltage, so as to extend the time for the energy storage circuit to supply power to the power conversion circuit, thereby extending the hold-up time length of the output voltage. By extending the hold-up time length of the output voltage, the effects on the output voltage due to the voltage dips or short interruptions of the AC voltage can be eliminated.

To make the aforementioned and other features of the disclosure more comprehensible, several embodiments accompanied with drawings are described in detail as follows.

DETAILED DESCRIPTION OF DISCLOSED EMBODIMENTS

Figure 1:
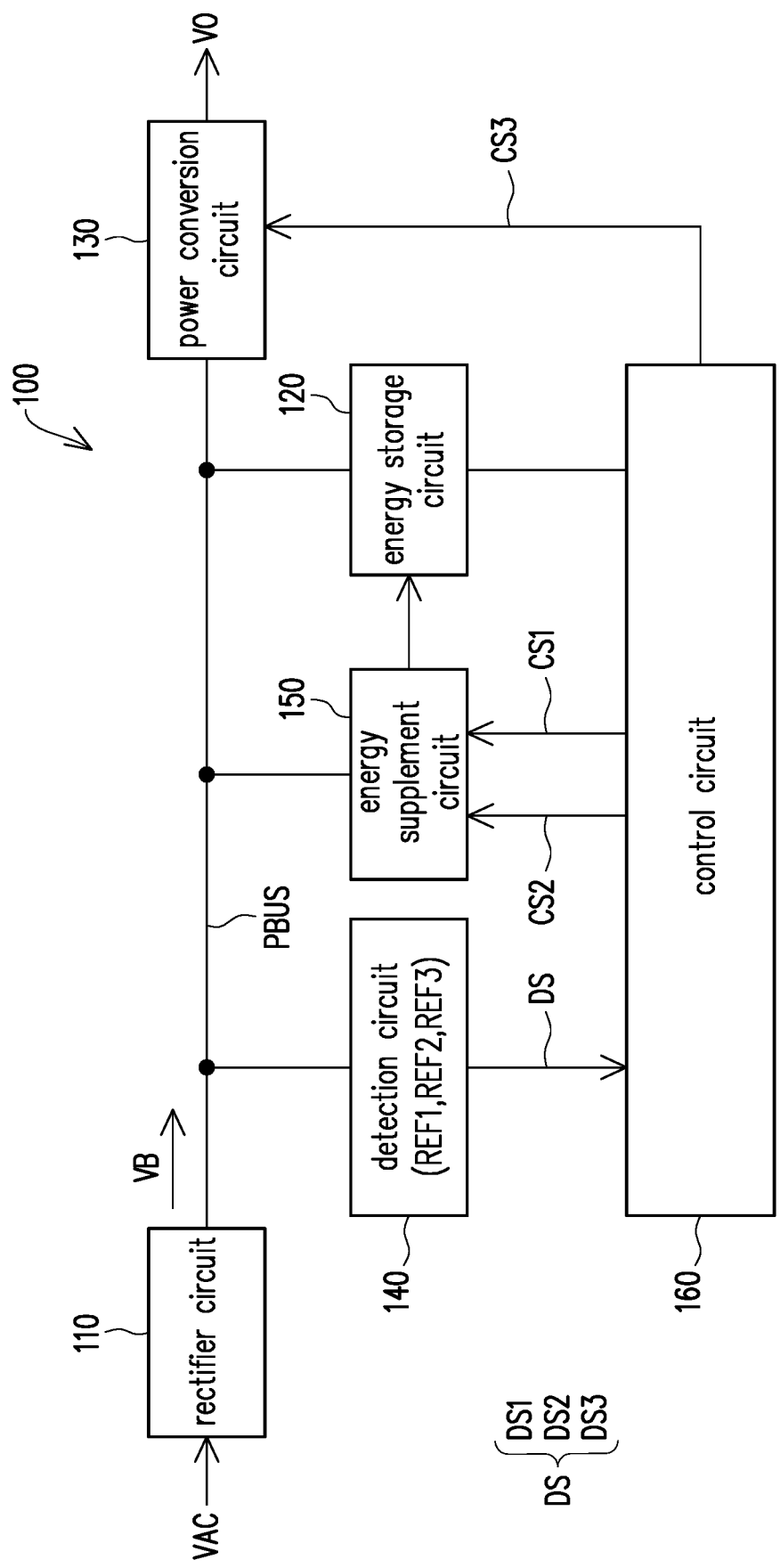
FIG. 1 is a block schematic diagram of a power supply apparatus according to an embodiment of the disclosure.

In order to facilitate easier understanding of the content of the disclosure, embodiments are exemplified below as examples of the disclosure being implemented. In addition, wherever possible, the elements, members, and steps using the same reference numerals in the drawings and embodiments represent the same or similar components.

FIG. 1 is a block schematic diagram of a power supply apparatus 100 according to an embodiment of the disclosure. Referring to FIG. 1, the power supply apparatus 100 may include a rectifier circuit 110, an energy storage circuit 120, a power conversion circuit 130, a detection circuit 140, an energy supplement circuit 150, and a control circuit 160, but is not limited thereto. The rectifier circuit 110 is configured to receive an alternating current (AC) voltage VAC and rectify the AC voltage VAC to provide a direct current (DC) voltage VB to a power bus PBUS. In an embodiment of the disclosure, the rectifier circuit 110 may be implemented by a conventional filter rectifier, but the disclosure is not limited thereto.

The energy storage circuit 120 is coupled to the power bus PBUS and is configured to store electrical energy according to the DC voltage VB and stabilize the DC voltage VB. In detail, when the AC voltage VAC supplies power to the power supply apparatus 100, the DC voltage VB may charge the energy storage circuit 120. In addition, when the AC voltage VAC is instantaneously dropped or interrupted for a short time, the energy storage circuit 120 may provide electrical energy to the power bus PBUS to stabilize the DC voltage VB, or the energy storage circuit 120 may provide backup power to replace the DC voltage VB and supply power to the power conversion circuit 130.

The power conversion circuit 130 is coupled to the power bus PBUS and is configured to convert the DC voltage VB to an output voltage VO, so as to supply power to other electronic apparatuses. In an embodiment of the disclosure, the power conversion circuit 130 may be implemented by an isolated or non-isolated DC to DC conversion circuit, but the disclosure is not limited thereto. The disclosure does not limit the type of the power conversion circuit 130.

The detection circuit 140 is coupled to the power bus PBUS and is configured to detect a voltage amplitude of the AC voltage VAC according to the DC voltage VB, and generate a detection signal group DS accordingly. In an embodiment of the disclosure, the detection circuit 140 may be implemented by a conventional voltage sensing circuit, but the disclosure is not limited thereto.

The energy supplement circuit 150 is coupled to the power bus PBUS and is configured to store electrical energy according to the DC voltage VB. The control circuit 160 is coupled to the detection circuit 140 to receive the detection signal group DS and is coupled to the energy supplement circuit 150. In an embodiment of the disclosure, the control circuit 160 may be implemented by a hardware circuit such as a micro controller, a micro processer, an application specific integrated circuit (ASIC), a programmable logic device (PLD), or a field programmable gate array (FPGA), but the disclosure is not limited thereto.

When the control circuit 160 determines that the voltage amplitude of the AC voltage VAC is less than or equal to a first threshold TH1 according to the detection signal group DS, it represents that the AC voltage VAC is interrupted for a short time, and the control circuit 160 may generate a first control signal CS1 to the energy supplement circuit 150. The energy supplement circuit 150 may charge the energy storage circuit 120 according to the stored electrical energy in response to the first control signal CS1, so as to extend the time for the energy storage circuit 120 to supply power to the power conversion circuit 130, thereby extending the hold-up time length of the output voltage VO, wherein the hold-up time length of the output voltage VO is the time length between the timepoint when the AC voltage VAC starts to be interrupted and the timepoint when the output voltage VO starts to drop. By extending the hold-up time length of the output voltage VO, the effect on the output voltage VO due to the short interruptions of the AC voltage VAC can be eliminated. For example, if the hold-up time length of the output voltage VO provided by the power supply apparatus 100 is more than 4 seconds, the short interruptions of the AC voltage VAC will not affect the output voltage VO.

In an embodiment of the disclosure, when the control circuit 160 determines that the voltage amplitude of the AC voltage VAC is less than or equal to the first threshold TH1 according to the detection signal group DS, the control circuit 160 may generate a second control signal CS2 to the energy supplement circuit 150. The energy supplement circuit 150 may stop storing electrical energy according to the DC voltage VB in response to the second control signal CS2. At this time, the second control signal CS2 provided by the control circuit 160 may be, for example, a voltage signal with a first level.

In an embodiment of the disclosure, the first threshold TH1 may be, for example, zero volt, but the disclosure is not limited thereto. The first threshold TH1 may be set according to actual application or design requirements.

In an embodiment of the disclosure, the control circuit 160 may also be coupled to the energy storage circuit 120 to detect a voltage value of the energy storage circuit 120. When the voltage value of the energy storage circuit 120 is less than or equal to a second threshold TH2, it represents interruptions of the AC voltage VAC, and the control circuit 160 may generate the first control signal CS1 to the energy supplement circuit 150, so that the energy supplement circuit 150 charges the energy storage circuit 120 according to the stored electrical energy in response to the first control signal CS1, so as to extend the time for the energy storage circuit 120 to supply power to the power conversion circuit 130, thereby extending the hold-up time length of the output voltage VO. The second threshold TH2 may be set according to actual application or design requirements.

In an embodiment of the disclosure, the power supply apparatus 100 may perform different operations according to different voltage amplitudes of the AC voltage VAC. In detail, as previously described, the detection circuit 140 may detect the voltage amplitude of the AC voltage VAC according to the DC voltage VB and generate the detection signal group DS accordingly. In the embodiment, the detection signal group DS may include detection signals DS1 to DS3.

Figure 2:
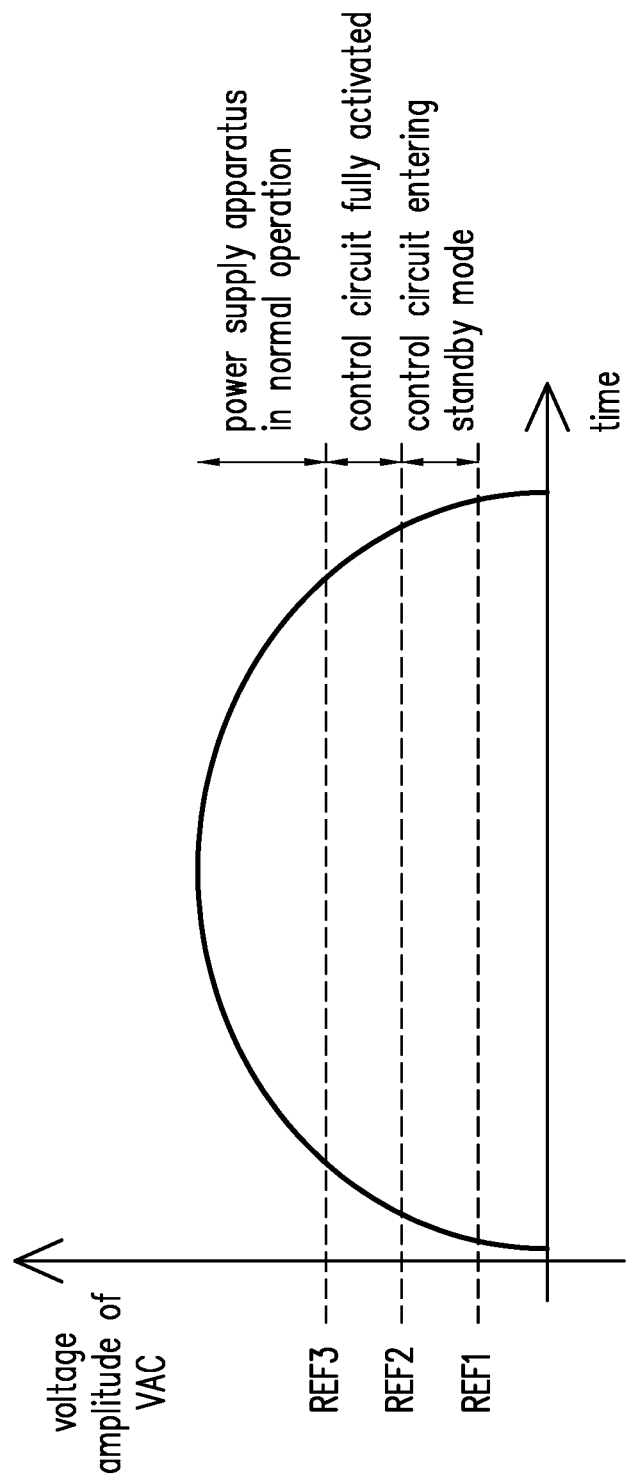
FIG. 2 is a schematic diagram of a voltage amplitude of an alternating current (AC) voltage corresponding to an operation of a power supply apparatus according to an embodiment of the disclosure.

More specifically, FIG. 2 is a schematic diagram of the voltage amplitude of the AC voltage VAC corresponding to the operation of the power supply apparatus 100 according to an embodiment of the disclosure. Please refer to FIG. 1 and FIG. 2 together. When the voltage amplitude of the AC voltage VAC is less than a reference value REF1, it represents that the voltage of the AC voltage VAC is too low, so the power supply apparatus 100 does not operate. In an embodiment of the disclosure, a reference value REF1 may be, for example, 20 volts, but the disclosure is not limited thereto.

If the voltage amplitude of the AC voltage VAC is greater than the reference value REF1 and less than a reference value REF2, the detection circuit 140 will generate the detection signal DS1 and the control circuit 160 will enter a standby mode in response to the detection signal DS1, wherein the reference value REF2 is greater than the reference value REF1. In an embodiment of the disclosure, the reference value REF2 may be, for example, 40 volts, but the disclosure is not limited thereto.

If the voltage amplitude of the AC voltage VAC is greater than the reference value REF2 and less than the reference value REF3, the detection circuit 140 will generate the detection signal D2 and the control circuit 160 will be fully activated in response to the detection signal DS2, wherein the reference value REF3 is greater than the reference value REF2.

If the voltage amplitude of the AC voltage VAC is greater than the reference value REF3, the detection circuit 140 will generate the detection signal DS3. The control circuit 160 will generate the second control signal CS2 to the energy supplement circuit 150 in response to the detection signal DS3 and the energy supplement circuit 150 will start storing electrical energy according to the DC voltage VB in response to the second control signal CS2. At this time, the second control signal CS2 provided by the control circuit 160 may be, for example, a voltage signal with the second level. In addition, the control circuit 160 further activates the power supply apparatus 100 and generates the third control signal CS3 to the power conversion circuit 130 in response to the detection signal DS3, so that the energy storage circuit 120 starts to store electrical energy according to the DC voltage VB. Also, the power conversion circuit 130 starts to convert the DC voltage VB to the output voltage VO according to the third control signal CS3, wherein the reference value REF3 is less than 70 volts. In an embodiment of the disclosure, the reference value REF3 may be, for example, 60 volts, but the disclosure is not limited thereto. It can be understood that as long as the voltage amplitude of the AC voltage VAC is greater than the reference value REF3, the power supply apparatus 100 can operate normally.

In general, the safety standard of the input voltage (i.e., the AC voltage VAC) of the power supply apparatus 100 is between 100 volts and 240 volts. In the case where the input voltage of the power supply apparatus 100 is the AC voltage VAC of 100 volts, even if the amplitude of the AC voltage VAC drops to 70 volts due to voltage dips, the power supply apparatus 100 of the embodiment can still operate normally and can provide the output voltage VO. Therefore, the operation of the power supply apparatus 100 is not affected by the voltage dips of the AC voltage VAC.

Figure 3:
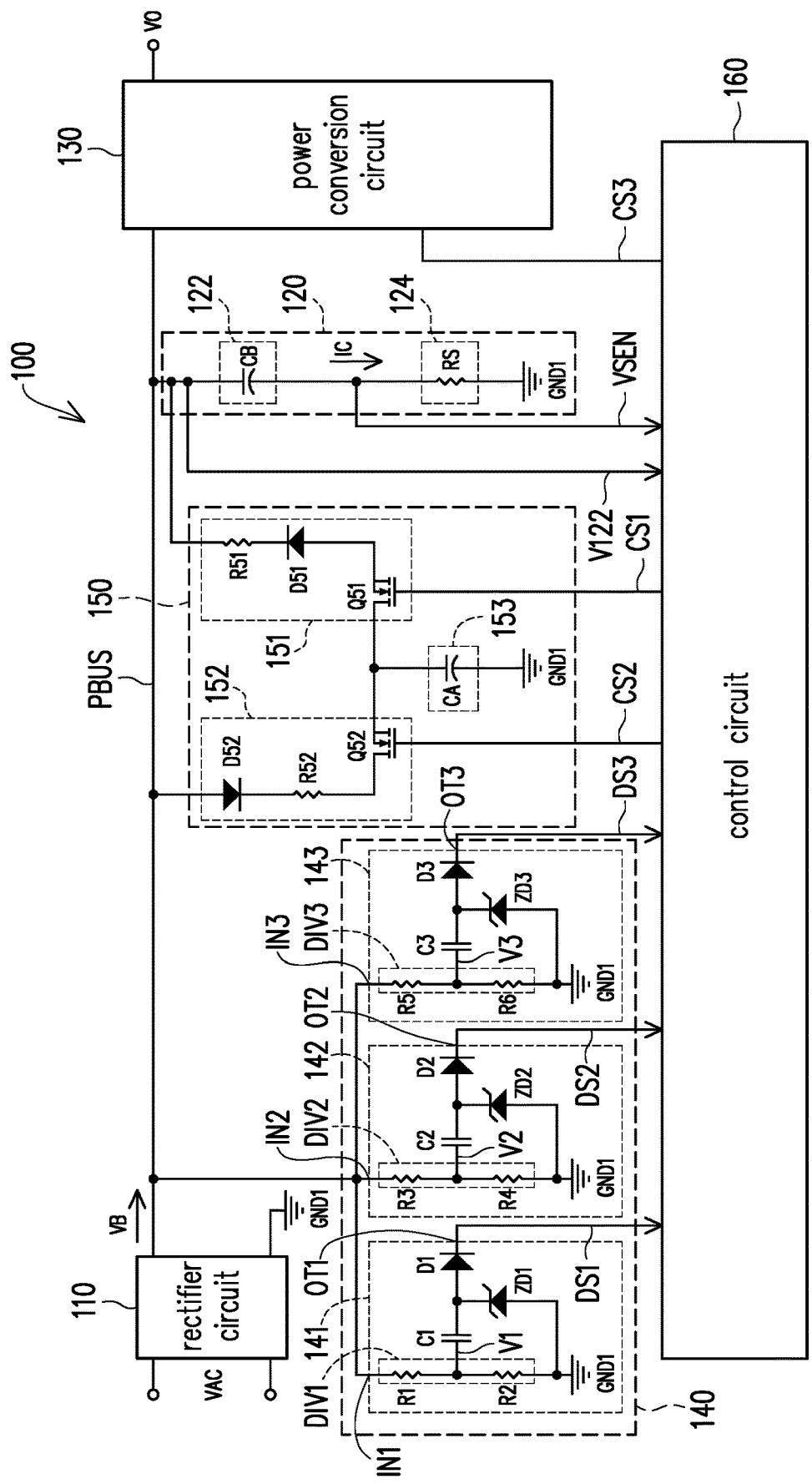
FIG. 3 is a schematic diagram of a circuit architecture of the power supply apparatus of FIG. 1 according to an embodiment of the disclosure.

FIG. 3 is a schematic diagram of a circuit architecture of the power supply apparatus 100 of FIG. 1 according to an embodiment of the disclosure. Referring to FIG. 3. The energy storage circuit 120 may include an energy storage element 122 and a sensing circuit 124. A first terminal of the energy storage element 122 is coupled to the power bus PBUS. The sensing circuit 124 is coupled between a second terminal of the energy storage element 122 and a ground terminal GND1, and is configured to provide a sensing voltage VSEN. In an embodiment of the disclosure, the energy storage element 122 may be implemented by a capacitor CB, and the sensing circuit 124 may be implemented by a resistor RS, but the disclosure is not limited thereto.

The detection circuit 140 may include a first sub detection circuit 141, a second sub detection circuit 142, and a third sub detection circuit 143, but is not limited thereto. An input terminal IN1 of the first sub detection circuit 141 is coupled to the power bus PUBS to receive the DC voltage VB. An output terminal OT1 of the first sub detection circuit 141 is coupled to the control circuit 160 and provides the detection signal DS1. An input terminal IN2 of the second sub detection circuit 142 is coupled to the power bus PBUS to receive the DC voltage VB. An output terminal OT2 of the second sub detection circuit 142 is coupled to the control circuit 160 and provides the detection signal DS2. An input terminal IN3 of the third sub detection circuit 143 is coupled to the power bus PBUS to receive the DC voltage VB. An output terminal OT3 of the third sub detection circuit 143 is coupled to the control circuit 160 and provides the detection signal DS3.

In detail, the first sub detection circuit 141 may include a voltage division circuit DIV1, a filter capacitor C1, a Zener diode ZD1, and a diode D1. The voltage division circuit DIV1 is coupled between the input terminal IN1 and the ground terminal GND1, and is configured to divide the DC voltage VB to generate a divided voltage V1, wherein the voltage division circuit DIV1 may be composed of resistors R1 and R2 connected in series, but is not limited thereto. A first terminal of the filter capacitor C1 is coupled to the voltage division circuit DIV1 to receive the divided voltage V1. A cathode terminal of the Zener diode ZD1 is coupled to a second terminal of the filter capacitor C1. An anode terminal of the Zener diode ZD1 is coupled to the ground terminal GND1. An anode terminal of the diode D1 is coupled to the second terminal of the filter capacitor C1. A cathode terminal of the diode D1 is coupled to the output terminal OT1 to provide the detection signal DS1.

The second sub detection circuit 142 may include a voltage division circuit DIV2, a filter capacitor C2, a Zener diode ZD2, and a diode D2. The voltage division circuit DIV2 is coupled between the input terminal IN2 and the ground terminal GND1, and is configured to divide the DC voltage VB to generate a divided voltage V2, wherein the voltage division circuit DIV2 may be composed of resistors R3 and R4 connected in series, but is not limited thereto. A first terminal of the filter capacitor C2 is coupled to the voltage division circuit DIV2 to receive the divided voltage V2. A cathode terminal of the Zener diode ZD2 is coupled to the second terminal of the filter capacitor C2. An anode terminal of the Zener diode ZD2 is coupled to the ground terminal GND1. An anode terminal of the diode D2 is coupled to the second terminal of the filter capacitor C2. A cathode terminal of the diode D2 is coupled to the output terminal OT2 to provide the detection signal DS2.

The third sub detection circuit 143 may include a voltage division circuit DIV3, a filter capacitor C3, a Zener diode ZD3, and a diode D3. The voltage division circuit DIV3 is coupled between the input terminal IN3 and the ground terminal GND1, and is configured to divide the DC voltage VB to generate a divided voltage V3, wherein the voltage division circuit DIV3 may be composed of resistors R5 and R6 connected in series, but is not limited thereto. A first terminal of the filter capacitor C3 is coupled to the voltage division circuit DIV3 to receive the divided voltage V3. A cathode end of the Zener diode ZD3 is coupled to the second terminal of the filter capacitor C3. An anode end of the Zener diode ZD3 is coupled to the ground terminal GND1. An anode terminal of the diode D3 is coupled to the second terminal of the filter capacitor C3. A cathode terminal of the diode D3 is coupled to the output terminal OT3 to provide the detection signal DS3.

It is worth mentioning that the breakdown voltage value of the Zener diode ZD1 is less than the breakdown voltage value of the Zener diode ZD2, and the breakdown voltage value of the Zener diode ZD2 is less than the breakdown voltage value of the Zener diode ZD3. In an embodiment of the disclosure, the breakdown voltage value of the Zener diode ZD1 may be, for example, 5 volts, the breakdown voltage value of the Zener diode ZD2 may be, for example, 10 volts, and the breakdown voltage value of the Zener diode ZD3 may be, for example, 15 volts, but is not limited thereto.

The energy supplement circuit 150 may include a first switch circuit 151, a second switch circuit 152, and an energy storage element 153, but is not limited thereto. A first terminal of the energy storage element 153 is coupled to the ground terminal GND1. The first switch circuit 151 is coupled between a second terminal of the energy storage element 153 and the energy storage circuit 120, and is controlled to be turned on and off by the first control signal CS1. The second switch circuit 152 is coupled between the second terminal of the energy storage element 153 and the power bus PBUS, and is controlled to be turned on and off by the second control signal CS2.

In an embodiment of the disclosure, the first switch circuit 151 may include a switch Q51, a diode D51, and a current limiting resistor R51, but is not limited thereto. A first terminal of the switch Q51 is coupled to the second terminal of the energy storage element 153, a second terminal of the switch Q51 is coupled to an anode terminal of the diode D51, and a control terminal of the switch Q51 receives the first control signal CS1. The current limiting resistor R51 is coupled between a cathode terminal of the diode D51 and the energy storage circuit 120.

In an embodiment of the disclosure, the second switch circuit 152 may include a switch Q52, a diode D52, and a current limiting resistor R52, but is not limited thereto. A first terminal of the switch Q52 is coupled to the second terminal of the energy storage element 153, a second terminal of the switch Q52 is coupled to a first terminal of the current limiting resistor R52, and a control terminal of the switch Q52 receives the second control signal CS2. A cathode terminal of the diode D52 is coupled to the second terminal of the current limiting resistor R52, and an anode terminal of the diode D52 is coupled to the power bus PBUS.

In an embodiment of the disclosure, the energy storage element 153 may be implemented by a capacitor CA, but the disclosure is not limited thereto.

Referring to FIG. 2 and FIG. 3 together. To facilitate illustration, the reference values REF1, REF2, and REF3 are respectively 20 volts, 40 volts, and 60 volts, and the breakdown voltage values of the Zener diodes ZD1, ZD2, and ZD3 are respectively 5 volts, 10 volts, and 15 volts, but the disclosure is not limited thereto. Firstly, when the voltage amplitude of the AC voltage VAC is less than the reference value REF1 (20 volts), the power supply apparatus 100 does not operate. When the voltage amplitude of the AC voltage VAC is greater than the reference value REF1 (20 volts) and less than the reference value REF2 (40 volts), the voltage division circuit DIV1 may generate the divided voltage V1 which is more than 5 volts according to the DC voltage VB, so that the Zener diode ZD1 breaks down and provides the detection signal DS1 being 5 volts to the control circuit 160 through the diode D1. Therefore, the control circuit 160 may enter the standby mode in response to the detection signal DS1 being 5 volts.

When the voltage amplitude of the AC voltage VAC is greater than the reference value REF2 (40 volts) and less than the reference value REF3 (60 volts), the voltage division circuit DIV2 may generate the divided voltage V which is greater than 10 volts according to the DC voltage VB, so that the Zener diode ZD2 breaks down and provides the detection signal DS2 being 10 volts to the control circuit 160 through the diode D2. Therefore, the control circuit 160 is fully activated in response to the detection signal DS2 being 10 volts.

Then, when the voltage amplitude of the AC voltage VAC is greater than the reference value REF3 (60 volts), the voltage division circuit DIV3 may generate the divided voltage V3 which is greater than 15 volts according to the DC voltage VB, so that the Zener diode ZD3 breaks down and provides the detection signal DS3 being 15 volts to the control circuit 160 through the diode D3. The control circuit 160 generates, for example, the second control signal CS2 which is a logic high level signal in response to the detection signal DS3 being 15 volts to turn on the switch Q52, and generates the third control signal CS3 to the power conversion circuit 130. In this way, the DC voltage VB may charge the energy storage element 153 through the diode D52 and the current limiting resistor R52, so that the energy storage element 153 stores electrical energy, wherein the switch Q51 is in an off state. In addition, the DC voltage VB also charges the energy storage element 122 of the energy storage circuit 120, and the power conversion circuit 130 converts the DC voltage VB to the output voltage VO according to the third control signal CS3.

Since the power supply apparatus 100 may provide the output voltage VO in the case where the voltage amplitude of the AC voltage VAC is more than the reference value REF3 (60 volts), even if the amplitude of AC voltage VAC drops from 100 volts to 70 volts due to a voltage dips test, the power supply apparatus 100 can still work normally and can provide the output voltage VO. In other words, the operation of the power supply apparatus 100 is not affected by the voltage dips of the AC voltage VAC.

In an embodiment of the disclosure, the control circuit 160 is further coupled to the sensing circuit 124 to receive the sensing voltage VSEN. The control circuit 160 may detect a voltage change of the sensing voltage VSEN and determines whether the voltage dips of the AC voltage VAC have occurred. In detail, if the voltage dips of the AC voltage VAC have occurred (i.e., the amplitude of the AC voltage VAC drops by thirty percent), a voltage value V122 of the energy storage element 122 will also drop by thirty percent. Therefore, the capacitor CB in the energy storage element 122 will generate a capacitance current IC, as shown in Equation (1), where C is the capacitance value of the capacitor CB and the capacitance current IC is proportional to the voltage change of the voltage value V122.

$$IC = C \cdot \frac{dV122}{dt} \qquad \text{Equation (1)}$$

The sensing circuit 124 may generate the sensing voltage VSEN in response to the capacitance current IC flowing through the sensing circuit 124. If the voltage change of the sensing voltage VSEN is thirty percent, the control circuit 160 may determine that the voltage dips of the AC voltage VAC have occurred, so the control circuit 160 may generate, for example, the first control signal CS1 being a logic high level signal to the energy supplement circuit 150 to turn on the switch Q51. In this way, the electrical energy stored in the energy storage element 153 will charge the energy storage element 122 of the energy storage circuit 120 through the diode D51 and the current limiting resistor R51, so as to extend the time during which the power conversion circuit 130 is powered, thereby extending the hold-up time length of the output voltage VO.

On the other hand, when the amplitude of the AC voltage VAC drops to zero volt due to a short interruptions test, the detection signals DS1 to DS3 are all zero volt, and the control circuit 160 may generate, for example, the second control signal CS2 being a logic low level signal according to the detection signals DS1 to DS3 being zero volt to turn off the switch Q52, and may generate, for example, the first control signal CS1 being a logic high level signal to turn on the switch Q51. As a result, the electrical energy stored in the energy storage element 153 will charge the energy storage element 122 of the energy storage circuit 120 through the diode D51 and the current limiting resistor R51. Therefore, the energy storage elements 122 and 153 may provide backup power together to supply power to the power conversion circuit 130, so as to extend the time during which the power conversion circuit 130 is powered, thereby extending the hold-up time length of the output voltage VO. In an embodiment of the disclosure, when the AC voltage VAC is 100 volts and in the case where the capacitance values of the capacitors CB and CA are respectively 120 g and 100 g, the hold-up time length of the output voltage VO may reach 5.4 seconds. Therefore, the output voltage VO of the power supply apparatus 100 is not affected by the short interruptions of the AC voltage VAC.

In an embodiment of the disclosure, the control circuit 160 may also detect the voltage value V122 of the energy storage element 122. When the voltage value V122 of the energy storage element 122 is less than or equal to the second threshold TH2, it represents that the short interruptions of the AC voltage VAC have occurred, the control circuit 160 may generate, for example, the first control signal CS1 being a logic high level signal to turn on the switch Q51. As a result, the electrical energy stored in the energy storage element 153 will charge the energy storage element 122 of the energy storage circuit 120 through the diode D51 and the current limiting resistor R51.

In summary, in the power supply apparatus provided by the embodiments of the disclosure, the energy supplement circuit can charge the energy storage circuit during the voltage dips and short interruptions of the AC voltage, so as to extend the time for the energy storage circuit to supply power to the power conversion circuit, thereby extending the hold-up time length of the output voltage. By extending the hold-up time length of the output voltage, the effects on the output voltage due to the voltage dips or short interruptions of the AC voltage can be eliminated. Therefore, the power supply apparatus can pass the Level A test of the International Electrotechnical Commission IEC 6100-4-11 standard regarding the voltage dips or short interruptions.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power supply apparatus, comprising:
a rectifier circuit, configured to receive an alternating current (AC) voltage and rectify the AC voltage to provide a direct current (DC) voltage to a power bus;
an energy storage circuit, coupled to the power bus, and configured to store electrical energy according to the DC voltage and stabilize the DC voltage;
a power conversion circuit, coupled to the power bus, and configured to convert the DC voltage to an output voltage;
a detection circuit, coupled to the power bus, and configured to detect a voltage amplitude of the AC voltage according to the DC voltage and generate a detection signal group accordingly;
an energy supplement circuit, coupled to the power bus, and configured to store electrical energy according to the DC voltage; and
a control circuit, coupled to the detection circuit to receive the detection signal group and coupled to the energy supplement circuit,
wherein when the control circuit determines that the voltage amplitude of the AC voltage is less than or equal to a first threshold according to the detection signal group, the control circuit generates a first control signal to the energy supplement circuit and the energy supplement circuit charges the energy storage circuit in response to the first control signal, so as to extend a hold-up time length of the output voltage,
wherein the detection signal group further includes a detection signal, if the voltage amplitude of the AC voltage is greater than a reference value, the detection circuit generates the detection signal, the control circuit generates a second control signal to the energy supplement circuit in response to the detection signal, and the energy supplement circuit starts storing electrical energy according to the DC voltage in response to the second control signal,
wherein the control circuit is further configured to activate the power supply apparatus and generate a third control signal to the power conversion circuit in response to the detection signal, so that the energy storage circuit starts storing electrical energy according to the DC voltage and the power conversion circuit starts converting the DC voltage to the output voltage according to the third control signal, wherein the reference value is less than 70 volts.

2. The power supply apparatus according to claim 1, wherein when the control circuit determines that the voltage amplitude of the AC voltage is less than or equal to the first threshold according to the detection signal group, the control circuit generates the second control signal to the energy supplement circuit and the energy supplement circuit stops storing electrical energy according to the DC voltage in response to the second control signal.

3. The power supply apparatus according to claim 1, wherein the control circuit is further coupled to the energy storage circuit to detect a voltage value of the energy storage circuit, when the voltage value of the energy storage circuit is less than or equal to a second threshold, the control circuit generates the first control signal to the energy supplement circuit, such that the energy supplement circuit charges the energy storage circuit in response to the first control signal.

4. The power supply apparatus according to claim 1, wherein the energy storage circuit comprises:
an energy storage element, wherein a first terminal of the energy storage element is coupled to the power bus; and
a sensing circuit, coupled between a second terminal of the energy storage element and a ground terminal, and configured to provide a sensing voltage, wherein the control circuit is further coupled to the sensing circuit to receive the sensing voltage and detect a voltage change of the sensing voltage, wherein if the voltage change of the sensing voltage is thirty percent, the control circuit generates the first control signal to the energy supplement circuit, so that the energy supplement circuit charges the energy storage circuit in response to the first control signal.

5. The power supply apparatus according to claim 1, wherein:

the detection signal group further includes a first detection signal, if the voltage amplitude of the AC voltage is greater than a first reference value and less than a second reference value, the detection circuit generates the first detection signal and the control circuit enters a standby mode in response to the first detection signal, wherein the second reference value is greater than the first reference value.

6. The power supply apparatus according to claim 5, wherein:

the detection signal group further includes a second detection signal, if the voltage amplitude of the AC voltage is greater than the second reference value and less than the reference value, the detection circuit generates the second detection signal and the control circuit is fully activated in response to the second detection signal, wherein the reference value is greater than the second reference value.

7. The power supply apparatus according to claim 6, wherein the detection circuit comprises:

a first sub detection circuit, wherein an input terminal of the first sub detection circuit is coupled to the power bus to receive the DC voltage, and an output terminal of the first sub detection circuit is coupled to the control circuit and provides the first detection signal;

a second sub detection circuit, wherein an input terminal of the second sub detection circuit is coupled to the power bus to receive the DC voltage, and an output terminal of the second sub detection circuit is coupled to the control circuit and provides the second detection signal; and a third sub detection circuit, wherein an input terminal of the third sub detection circuit is coupled to the power bus to receive the DC voltage, and an output terminal of the third sub detection circuit is coupled to the control circuit and provides the detection signal.

8. The power supply apparatus according to claim 7, wherein each of the first sub detection circuit, the second sub detection circuit, and the third sub detection circuit comprises:

a voltage division circuit, coupled between the input terminal and a ground terminal, and configured to divide the DC voltage to generate a divided voltage;

a filter capacitor, wherein a first terminal of the filter capacitor is coupled to the voltage division circuit to receive the divided voltage;

a Zener diode, wherein a cathode terminal of the Zener diode is coupled to a second terminal of the filter capacitor, and an anode terminal of the Zener diode is coupled to the ground terminal; and a first diode, wherein an anode terminal of the first diode is coupled to the second terminal of the filter capacitor, and a cathode terminal of the first diode is coupled to the output terminal, wherein a breakdown voltage value of the Zener diode of the first sub detection circuit is less than a breakdown voltage value of the Zener diode of the second sub detection circuit, and the breakdown voltage value of the Zener diode of the second sub detection circuit is less than a breakdown voltage value of the Zener diode of the third sub detection circuit.

9. The power supply apparatus according to claim 1, wherein the energy supplement circuit comprises:

an energy storage element, wherein a first terminal of the energy storage element is coupled to a ground terminal;

a first switch circuit, coupled between a second terminal of the energy storage element and the energy storage circuit, and controlled to be turned on and off by the first control signal; and a second switch circuit, coupled between the second terminal of the energy storage element and the power bus, and controlled to be turned on and off by the second control signal.

10. A power supply apparatus, comprising:

a rectifier circuit, configured to receive an alternating current (AC) voltage and rectify the AC voltage to provide a direct current (DC) voltage to a power bus;

an energy storage circuit, coupled to the power bus, and configured to store electrical energy according to the DC voltage and stabilize the DC voltage;

a power conversion circuit, coupled to the power bus, and configured to convert the DC voltage to an output voltage;

a detection circuit, coupled to the power bus, and configured to detect a voltage amplitude of the AC voltage according to the DC voltage and generate a detection signal group accordingly;

an energy supplement circuit, coupled to the power bus, and configured to store electrical energy according to the DC voltage; and a control circuit, coupled to the detection circuit to receive the detection signal group and coupled to the energy supplement circuit, wherein when the control circuit determines that the voltage amplitude of the AC voltage is less than or equal to a first threshold according to the detection signal group, the control circuit generates a first control signal to the energy supplement circuit and the energy supplement circuit charges the energy storage circuit in response to the first control signal, so as to extend a hold-up time length of the output voltage, wherein the detection signal group further includes a first detection signal, if the voltage amplitude of the AC voltage is greater than a first reference value and less than a second reference value, the detection circuit generates the first detection signal and the control circuit enters a standby mode in response to the first detection signal, wherein the second reference value is greater than the first reference value, wherein the detection signal group further includes a second detection signal, if the voltage amplitude of the AC voltage is greater than the second reference value and less than a third reference value, the detection circuit generates the second detection signal and the control circuit is fully activated in response to the second detection signal, wherein the third reference value is greater than the second reference value, wherein the detection signal group further includes a third detection signal, if the voltage amplitude of the AC voltage is greater than the third reference value, the detection circuit generates the third detection signal, the control circuit generates a second control signal to the energy supplement circuit in response to the third detection signal, and the energy supplement circuit starts storing electrical energy according to the DC voltage in response to the second control signal, wherein the control circuit further activates the power supply apparatus and generates a third control signal to the power conversion circuit in response to the third detection signal, so that the energy storage circuit starts storing electrical energy according to the DC voltage and the power conversion circuit starts converting the DC voltage to the output voltage according to the third control signal, wherein the third reference value is less than 70 volts.

11. A power supply apparatus, comprising:

a rectifier circuit, configured to receive an alternating current (AC) voltage and rectify the AC voltage to provide a direct current (DC) voltage to a power bus;

an energy storage circuit, coupled to the power bus, and configured to store electrical energy according to the DC voltage and stabilize the DC voltage;

a power conversion circuit, coupled to the power bus, and configured to convert the DC voltage to an output voltage;

a detection circuit, coupled to the power bus, and configured to detect a voltage amplitude of the AC voltage according to the DC voltage and generate a detection signal group accordingly;

an energy supplement circuit, coupled to the power bus, and configured to store electrical energy according to the DC voltage; and a control circuit, coupled to the detection circuit to receive the detection signal group and coupled to the energy supplement circuit, wherein when the control circuit determines that the voltage amplitude of the AC voltage is less than or equal to a first threshold according to the detection signal group, the control circuit generates a first control signal to the energy supplement circuit and the energy supplement circuit charges the energy storage circuit in response to the first control signal, so as to extend a hold-up time length of the output voltage, wherein the detection circuit comprises:

a first sub detection circuit, wherein an input terminal of the first sub detection circuit is coupled to the power bus to receive the DC voltage, and an output terminal of the first sub detection circuit is coupled to the control circuit and provides a first detection signal, wherein the first detection signal indicates that the voltage amplitude of the AC voltage is greater than a first reference value and less than a second reference value;

a second sub detection circuit, wherein an input terminal of the second sub detection circuit is coupled to the power bus to receive the DC voltage, and an output terminal of the second sub detection circuit is coupled to the control circuit and provides a second detection signal, wherein the second detection signal indicates that the voltage amplitude of the AC voltage is greater than the second reference value and less than a third reference value; and a third sub detection circuit, wherein an input terminal of the third sub detection circuit is coupled to the power bus to receive the DC voltage, and an output terminal of the third sub detection circuit is coupled to the control circuit and provides a third detection signal, wherein the third detection signal indicates that the voltage amplitude of the AC voltage is greater than the third reference value, wherein the third reference value is greater than the second reference value, and the second reference value is greater than the first reference value.

12. The power supply apparatus according to claim 11, wherein each of the first sub detection circuit, the second sub detection circuit, and the third sub detection circuit comprises:

a voltage division circuit, coupled between the input terminal and a ground terminal, and configured to divide the DC voltage to generate a divided voltage;

a filter capacitor, wherein a first terminal of the filter capacitor is coupled to the voltage division circuit to receive the divided voltage;

a Zener diode, wherein a cathode terminal of the Zener diode is coupled to a second terminal of the filter capacitor, and an anode terminal of the Zener diode is coupled to the ground terminal; and a first diode, wherein an anode terminal of the first diode is coupled to the second terminal of the filter capacitor, and a cathode terminal of the first diode is coupled to the output terminal, wherein a breakdown voltage value of the Zener diode of the first sub detection circuit is less than a breakdown voltage value of the Zener diode of the second sub detection circuit, and the breakdown voltage value of the Zener diode of the second sub detection circuit is less than a breakdown voltage value of the Zener diode of the third sub detection circuit.

* * * * *